US007177885B2

(12) United States Patent
Isip et al.

(10) Patent No.: US 7,177,885 B2
(45) Date of Patent: Feb. 13, 2007

(54) METHOD AND SYSTEM FOR REORGANIZING A TABLESPACE IN A DATABASE

(75) Inventors: Amando Isip, Richardson, TX (US); Stephen Weaver, Lisle, IL (US); Joseph Zelenka, Itasca, IL (US)

(73) Assignee: Computer Associates Think, Inc., Islandia, NY (US)

( * ) Notice: Subject to any disclaimer, the term of this patent is extended or adjusted under 35 U.S.C. 154(b) by 336 days.

(21) Appl. No.: 10/649,393

(22) Filed: Aug. 27, 2003

(65) Prior Publication Data

US 2004/0215632 A1 Oct. 28, 2004

Related U.S. Application Data

(63) Continuation of application No. 10/308,265, filed on Dec. 2, 2002, now abandoned, which is a continuation of application No. 10/113,774, filed on Apr. 1, 2002, now abandoned, which is a continuation of application No. 09/909,033, filed on Jul. 19, 2001, now abandoned.

(51) Int. Cl.
  *G06F 17/40* (2006.01)
(52) U.S. Cl. .................. 707/202; 707/102; 707/201; 707/204; 709/201; 717/101; 717/120
(58) Field of Classification Search .............. 707/7, 707/10, 101, 102, 201, 202, 5, 200, 8, 9, 707/204, 103 R; 434/322; 717/101, 143, 717/120; 709/201
See application file for complete search history.

(56) References Cited

U.S. PATENT DOCUMENTS

| 5,222,235 | A | * | 6/1993 | Hintz et al. ................. 707/101 |
| 5,396,623 | A | * | 3/1995 | McCall et al. .............. 707/101 |
| 5,408,654 | A | * | 4/1995 | Barry ......................... 707/101 |
| 5,485,608 | A | * | 1/1996 | Lomet et al. ............... 707/202 |
| 5,565,316 | A | * | 10/1996 | Kershaw et al. ............ 434/322 |
| 5,710,916 | A | * | 1/1998 | Barbara et al. ................ 707/9 |
| 5,758,357 | A | * | 5/1998 | Barry et al. ................ 707/202 |
| 5,812,849 | A | * | 9/1998 | Nykiel et al. .............. 717/101 |

(Continued)

OTHER PUBLICATIONS

Chomicki, Jan et al., "Implementing temporal integrity constraints using an active DBMS", IEEE Transaction on Knowledge and Data Engineering, Aug. 1995 vol. 7, Issue: 4, pp. 566-582, ☐☐.*

(Continued)

*Primary Examiner*—Shahid Alam
(74) *Attorney, Agent, or Firm*—Baker Botts L.L.P.

(57) ABSTRACT

A method of reorganizing a tablespace in a database may include reading a row of data from the database, analyzing the row of data read out from the database, determining whether to eliminate or retain the row of data based on at least one predetermined rule, reloading the row of data into the database when it is determined that the row of data complies with the at least one predetermined rule, eliminating the row of data when it is determined that the row of data does not comply with the at least one predetermined rule, and rebuilding an index related to the database to include keys that correspond to the reloaded row of data. The determining, reloading, eliminating and rebuilding steps are repeated for each row of data in the database.

24 Claims, 7 Drawing Sheets

U.S. PATENT DOCUMENTS

| | | | | |
|---|---|---|---|---|
| 5,832,508 | A | * | 11/1998 | Sherman et al. ............. 707/200 |
| 5,887,274 | A | * | 3/1999 | Barry et al. ................. 707/202 |
| 5,937,415 | A | * | 8/1999 | Sheffield et al. ............ 707/204 |
| 6,070,170 | A | * | 5/2000 | Friske et al. ................ 707/202 |
| 6,119,128 | A | * | 9/2000 | Courter et al. .............. 707/202 |
| 6,122,640 | A | * | 9/2000 | Pereira ................... 707/103 R |
| 6,173,292 | B1 | * | 1/2001 | Barber et al. ............... 707/200 |
| 6,351,744 | B1 | * | 2/2002 | Landresse ..................... 707/8 |

OTHER PUBLICATIONS

Kim, D et al., "A temporal database management main memory prototype", Proceeding of 1994 TENCON '94, IEEE Region 10's Ninth Annual International Conference. Theme: Frontiers of Computer Technology. Aug. 22-28, 1994. vol. 1, pp. 391-396, Aug. 1994, □□.*

* cited by examiner

FIGURE 1

PRODUCT TABLE

| product-name | part-no. | expire-date |
|---|---|---|
| product 1 | 001 | 6/2/01 |
| product 2 | 002 | 7/1/01 |
| product 3 | 003 | 12/24/01 |

PRIOR ART

PRIOR ART

PRIOR ART

FIGURE 5

PART NUMBER TABLE

| part-no. | product-name | expire-date |
|---|---|---|
| 001 | product 1 | 6/2/01 |
| 002 | product 2 | 7/1/01 |
| 003 | product 3 | 12/24/01 |

METHOD AND SYSTEM FOR REORGANIZING A TABLESPACE IN A DATABASE

This is a continuation of application Ser. No. 10/308,265 filed Dec. 2, 2002, now abandoned which is a continuation of Ser. No. 10/113,774 filed Apr. 1, 2002 now abandoned which is a continuation of application Ser. No. 09/909,033 filed Jul. 19, 2001 now abandoned.

BACKGROUND

1. Field of the Disclosure

The present disclosure relates to databases and, more particularly, to a method and system for reorganizing a tablespace in a database.

2. Related Art

Data in a database may exist as tables in the form of columns and rows of data, as shown in FIG. 1. In this example, a "product" table includes a plurality of columns (product-name, part-nos, expire-data) for storing rows of data related to different products (product 1, product 2, product 3, etc.). An index including a plurality of index keys related to the rows in the database may be provided to allow quick access to the data in the database. An index key is a minimum set of attributes that uniquely identifies each row in the database. For example, in the database illustrated FIG. 1, "product-name" may be the key, assuming for the sake of simplicity that each product has a unique product name. In other words, the name of a product can be used to uniquely identify the row in which data regarding the product is stored in the database.

The data in each row of the database or relation should be analyzed to ensure that the data meets certain check constraints and maintains referential integrity. A constraint is a rule that restricts the values in a database or table. For example, in the database illustrated in FIG. 1, an example of a constraint may be exp-date<May 16, 2001. That is to say, each value listed in the exp-date column should be less than May 16, 2001.

Referential integrity requires that all non-null foreign keys correspond to an actual key in some relation. A foreign key may be an attribute or a set of attributes in one table that constitutes a key in some other table. Foreign keys are used to demonstrate logical links between relations. For example, in the database illustrated in FIG. 1, the part number foreign key (part-no) may relate the Product table to a Parts table (not shown). Referential integrity ensures that the part-no attribute remains a key in the Parts table so that the relationship between the Product table and the Parts table (not shown) remains valid. Generally, check constraints and requirements for referential integrity are predetermined by an administrator of the database and may vary depending on the applications utilizing the data in the database.

When data in a row of a database or relation does not satisfy constraints or fails to maintain referential integrity, the data may be deleted. In addition, the index keys corresponding to the rows from which the data is deleted may be deleted from the index. After deletion, both the database and index may have "holes" including rows with no data and/or spaces where the keys were deleted. In order to maximize efficient use of space in the database and the index, these holes should be removed.

Presently, a checking utility may perform checking and deletion of data that fails to comply with constraints or referential integrity. A separate reorganizing utility may then be used to reorganize the remaining rows of data to reassemble the database while eliminating rows with no data. In addition, the reorganizing utility may rebuild the index related to the reorganized table to eliminate spaces left by deleted keys.

Operation of a checking utility for performing a method of checking data for compliance With constraints and for referential integrity is illustrated in FIG. 2. In step S20, the checking utility reads out a row of data from the database. In step S22, the data read out from the database is analyzed to ensure that the data complies with predetermined check constraints and maintains referential integrity. If the data from a row fails to meet these requirements, the checking utility may delete the data in that row. In step S24, index keys corresponding to the deleted row may also be deleted from an index that relates to the database. In step S26, the database and index are rewritten with spaces left by the deleted data and the deleted keys.

A reorganizing utility may then be invoked to eliminate the holes (e.g. spaces left by the deleted data and keys) in the database and index in the manner illustrated in FIG. 3. In step S30, the reorganizing utility reads a row of the database. In step 32, the row is reloaded into the database if the data in the row has not been deleted by the checking utility. In step S34, the index space is rebuilt to include index keys which correspond only to the row reloaded into the database by the reorganizing utility in step S32.

While such methods of checking and reorganizing data in a database work, some operational characteristics of such methods can be improved. For example, several input/output operations are used to perform these methods. Each row is read out by the checking utility and then each page of the database and index is rewritten after non-conforming data is deleted. The reorganizing utility then reads out each line of the database again and reloads the rows from which data is not deleted into the database. The reorganizing utility then rebuilds the index space to correspond to the reloaded database. The input/output operations are needlessly repetitive and increase the probability of errors being introduced into the data in the table.

The repetitive nature of the these methods also has a cost in time. First, the checking utility runs completely to read out and rewrite the data in the database and index. Then the reorganizing utility reads out each row of the database with corresponding index keys in the index and reloads the database and rebuilds the index space. While both of these utilities are running, the data in the table is unavailable for user applications or for online transactions.

It would therefore, be desirable to provide a method and system for checking and reorganizing data in a database or relation in a more efficient manner so that the data in the table will only be unavailable for a relatively short period of time.

SUMMARY OF THE DISCLOSURE

A method of reorganizing a tablespace in a database may include reading a row of data from the database, analyzing the row of data read out from the database, determining whether to eliminate or retain the row of data based on at least one predetermined rule, reloading the row of data into the database when it is determined that the row of data complies with the at least one predetermined rule, eliminating the row of data when it is determined that the row of data does not comply with the at least one predetermined rule, rebuilding an index related to the database to include keys that correspond to the reloaded row of data and repeating the determining, reloading, eliminating and rebuilding for each row of data in the database.

A system for reorganizing a tablespace in a database may include a reading device adapted to read out a row of data from the database, an analyzing device adapted to analyze the row of data to determine whether to eliminate or retain the row of data based on at least one predetermined rule, a reloading device adapted to reload the row of data when it is determined that the row of data satisfies the at least one predetermined rule, an eliminating device adapted to eliminate the row of data when it is determined that the row of data does not comply with the at least one predetermined rule, and a rebuilding device adapted to rebuild an index related to the database to include keys that correspond to the reloaded row of data, wherein each row of data in the database is read out from the database and analyzed.

A computer recording medium including computer executable code for reorganizing a tablespace in a database, where the computer executable code may include reading code for reading out a row of the data from the database, analyzing code for analyzing the row of data read out from the database, determining code for determining whether to eliminate or retain a row of data based oil at least one predetermined rule, reloading code for reloading the row of data when it is determined that the row of data complies with the at least one predetermined rule, eliminating code for eliminating the row of data when it is determined that the row of data does not comply with the at least one predetermined rule, rebuilding code for rebuilding an index related to the database to include keys corresponding to the reloaded row of data, and repeating code for repeating the determining, reloading, eliminating and rebuilding for each row of data in the database.

A method of reorganizing a tablespace in a database may include partitioning the database and a related index into a plurality of partitions, selecting one partition of the plurality of partitions of the database and a related partition of the related index, reading a row of data out from the selected one partition of the database, analyzing the row of data read out from the selected one partition, determining whether to eliminate or retain the row of data based on at least one predetermined rule, reloading the row of data into the selected one partition of the database when it is determined that the row of data complies with the at least one predetermined rule, eliminating the row of data when it is determined that the row of data does not comply with the at least one predetermined rule, rebuilding the related partition of the related index to include keys corresponding to the reloaded row of data, repeating the determining, reloading, eliminating and rebuilding for each row in the selected one partition of the database, and repeating the selecting, reading, analyzing, determining, reloading, eliminating and rebuilding for each partition in the database.

A system for reorganizing a tablespace in a database may include a partitioning device adapted to partition the database and a related index into a plurality of partitions, a partition selecting device adapted to select one partition of the plurality of partitions of the database and a related partition of the related index, a reading device adapted to read a row of data out from the selected one partition of the database, an analyzing device adapted to analyze the row of data read out from the selected one partition and determine whether to eliminate or retain the row of data based on at least one predetermined rule, a reloading device adapted to reload the row of data into the selected one partition of the database when it is determined that the row of data complies with the at least one predetermined rule, an eliminating device adapted to eliminate the row of data when it is determined that the row of data does not comply with the at least one predetermined rule; and a rebuilding device adapted to rebuilt the related partition of the related index to include keys corresponding to the reloaded rows of data, wherein each row of the selected one partition of the database and each partition of the plurality of partitions of the database are analyzed by the system.

A computer recording medium including computer executable code for reorganizing a tablespace in a database, where the computer executable code may include partitioning code for partitioning the database and a related index into a plurality of partitions, partition selecting code for selecting one partition of the plurality of partitions of the database and a related partition of the related index, reading code for reading a row of data out from the selected one partition, analyzing code for analyzing the row of data read out from the selected one partition, determining code for determining whether to eliminate or retain the row of data based on at least one predetermined rule, reloading code for reloading the row of data into the selected one partition of the database when it is determined that the row of data complies with the at least one predetermined rule, eliminating code for eliminating the row of data when it is determined that the row of data does not comply with the at least one predetermined rule, rebuilding code for rebuilding the related partition of the related index to include keys corresponding to the reloaded row of data, row repeating code for repeating the determining, reloading, eliminating and rebuilding for each row in the selected one partition of the database, and partition repeating code for repeating the selecting, reading, analyzing, determining reloading, eliminating and rebuilding for each partition in the database.

A two-step method of reorganizing a tablespace in a database, the two-step method being repeated for each row in the database, may include a first step including reading a row of data from the database, analyzing the rout of data read out from the database, determining whether to eliminate or retain the row of data based on at least one predetermined rule. A second step may include reloading the row of data into the database when it is determined that the row of data complies with the at least one predetermined rule, eliminating the row of data when it is determined that the row of data does not comply with the at least one predetermined rule, and rebuilding an index related to the database to include keys that correspond to the reloaded row of data.

A system performing a two-step process of reorganizing a tablespace in a database, the two-step process being repeated for each row in the database, may include a first step including reading a row of data from the database, analyzing the row of data read out from the database, and determining whether to eliminate or retain the row of data based on at least one predetermined rule. A second step may include reloading the row of data into the database when it is determined that the row of data complies with the at least one predetermined rule, eliminating the row of data when it is determined that the row of data does not comply with the at least one predetermined rule and rebuilding an index related to the database to include keys that correspond to the reloaded row of data.

A computer recording medium including computer executable code for reorganizing a tablespace in a database in two steps, the two steps being repeated for each row of data in the database, may include first step code including reading code for reading out a row of data from the database, analyzing code for analyzing the row of data read out from the database, and determining code for determining whether to eliminate or retain a row of data based on at least one predetermined rule. Second step code may include reloading code for reloading the row of data when it is determined that the row of data complies with the at least one predetermined rule, eliminating code for eliminating the row of data when it is determined that the row of data does not comply with the at least one predetermined rule, and rebuilding code for rebuilding an index related to the database to include keys corresponding to the reloaded row of data.

A two-step method of reorganizing a tablespace in a database, the two-step method being repeated for each row in a partition of the database and each partition of a plurality of partitions of the database, may include a first step including partitioning the database and a related index into the plurality of partitions, selecting one partition of the plurality of partitions of the database and a related partition of the related index, reading a row of data out from the selected one partition of the database, analyzing the row of data read out from the selected one partition, determining whether to eliminate or retain the row of data based on at least one predetermined rule. A second step may include reloading the row of data into the selected one partition of the database when it is determined that the row of data complies with the at least one predetermined rule, eliminating the row of data when it is determined that the row of data does not comply with the at least one predetermined rule, and rebuilding the related partition of the related index to include keys corresponding to the reloaded row of data.

A system performing a two-step process of reorganizing a tablespace of a database, the two-step process being repeated for each row in a partition of the database and each partition of a plurality of partitions of the database, may include a first step including partitioning the database and a related index into the plurality of partitions, selecting one partition of the plurality of partitions of tile database and a related partition of the related index, reading a row of data out from the selected one partition of the database, analyzing the row of data read out from the selected one partition, determining whether to eliminate or retain the row of data based on at least one predetermined rule. A second step may include reloading tile row of data into the selected one partition of the database when it is determined that the row of data complies with the at least one predetermined rule, eliminating the row of data when it is determined that the row of data does not comply with the at least one predetermined rule, and rebuilding the related partition of the related index to include keys corresponding to the reloaded row of data.

A computer recording medium including computer executable code for reorganizing a tablespace of a database in two steps, the two steps being repeated for each row of data of a partition of the database and each partition of a plurality of partitions of the database, the computer executable code may include first step code including partitioning code for partitioning the database and a related index into the plurality of partitions, partition selecting code for selecting one partition of the plurality of partitions of the database and a related partition of the related index, reading code for reading a row of data out from the selected one partition, analyzing code for analyzing the row of data read out from the selected one partition, and determining code for determining whether to eliminate or retain the row of data based on at least one predetermined rule. Second step code may include reloading code for reloading the row of data into the selected one partition of the database when it is determined that the row of data complies with the at least one predetermined rule, eliminating code for eliminating the row of data when it is determined that the row of data does not comply with the at least one predetermined rule, and rebuilding code for rebuilding the related partition of the related index to include keys corresponding to the reloaded row of data.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 1 is an illustration of a database in which data is stored.

FIG. 5 is an illustration of a database in which data is stored.

DETAILED DESCRIPTION

Figure 2:
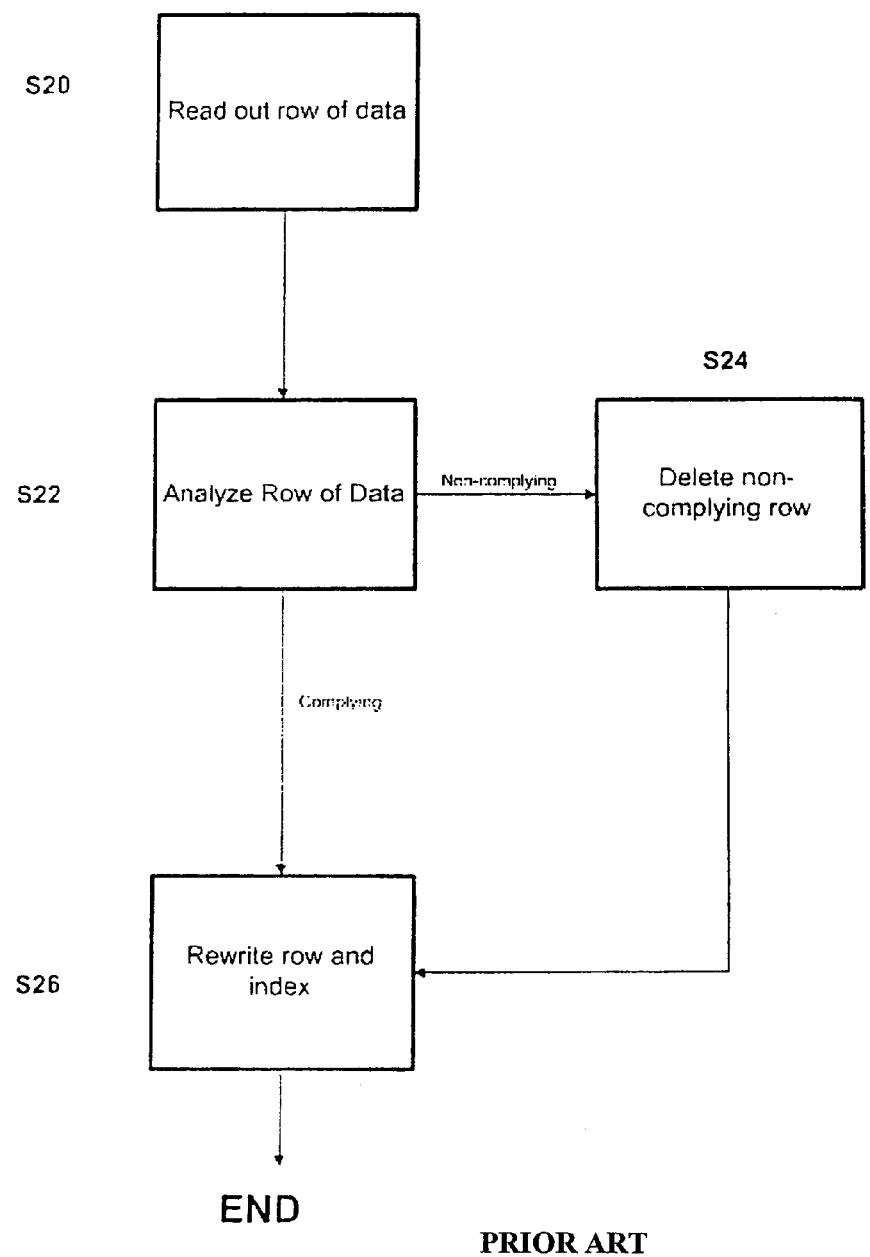
FIG. 2 is a flow chart illustrating operation of a check utility.
Figure 3:
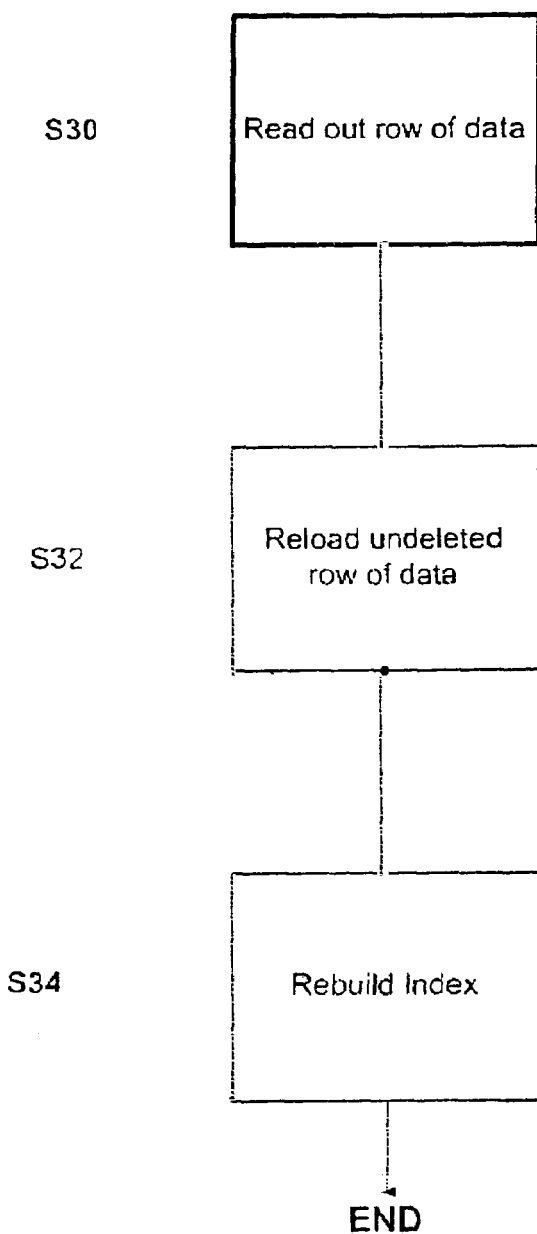
FIG. 3 is a flow chart illustrating operation of a reorganization utility.

In describing the preferred embodiments of the present disclosure illustrated in the drawings, specific terminology is employed for sake of clarity. However, the present disclosure is not intended to be limited to the specific terminology so selected and it is to be understood that each specific element includes all technical equivalents which operate in a similar manner.

The present method and system provide for reading out a row of a database and checking the data in the row for compliance with constraints and for referential integrity. If the data in the row meets these requirements the row of data is reloaded into the database, otherwise, the row of data is eliminated. An index related to the database is then rebuilt to include only keys that relate to rows of data reloaded into the database. The row of data is read out, analyzed and reloaded or eliminated and the index related to the database is rebuilt in a single seamless process.

The system and method may be implemented in the form of a software application running on a computer system such as a mainframe such as the OS/390, personal computer (PC), handheld computer, server etc. The computer system may be linked to a database. The link may be, for example, via a direct link such as a direct hard wire or wireless connection, via a network connection such as a local area network, or via the Internet.

Figure 4:
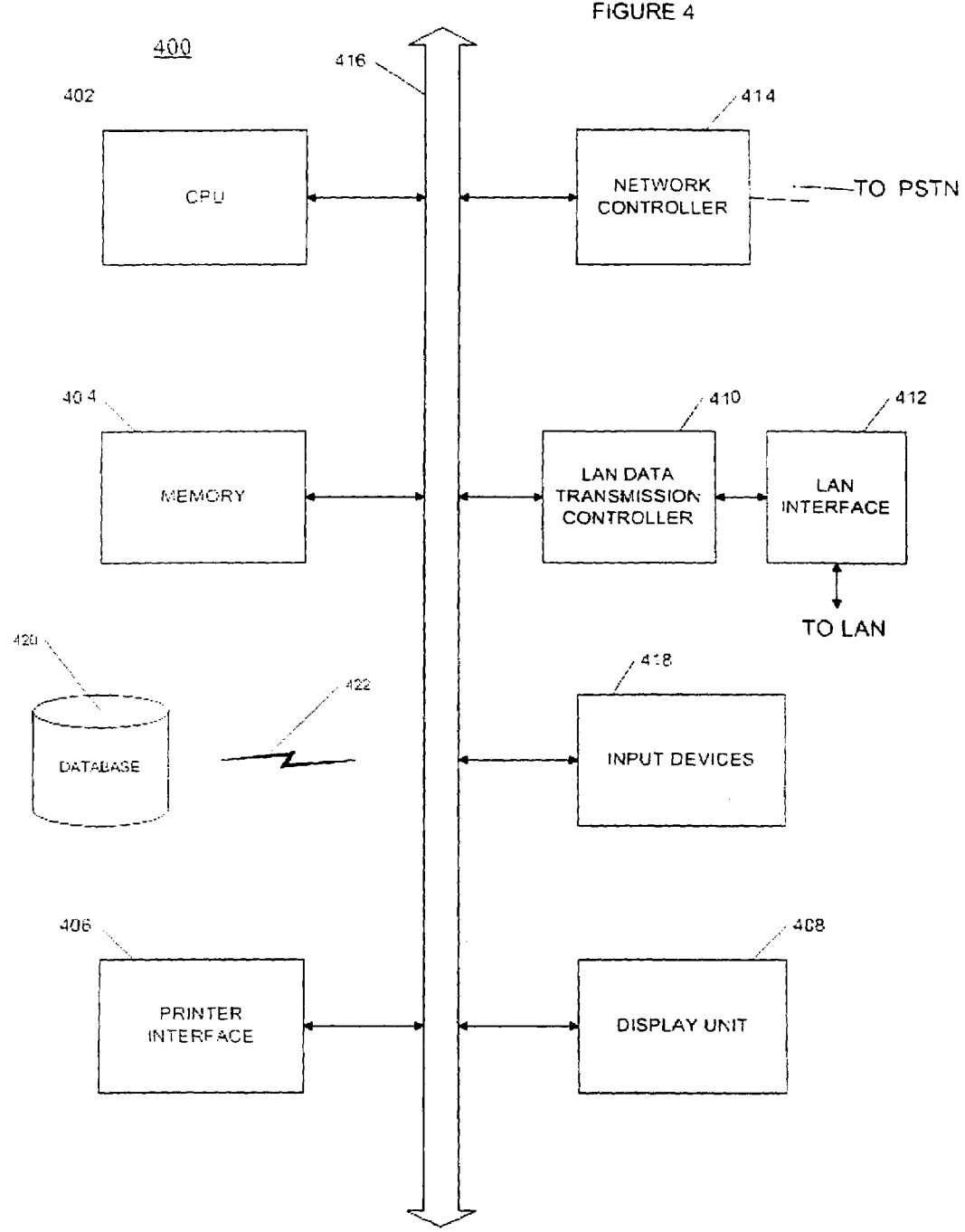
FIG. 4 is a block diagram illustrating a computer system for implementing a method and system according to the present disclosure.

An example of a computer system capable of implementing the present system and method is shown in FIG. 4. The computer system referred to generally as system 400 may include a central processing unit (CPU) 402, memory 404, a printer interface 406, a display unit 408, a LAN (local area network) data transmission controller 410, a LAN interface 412, a network controller 414, an internal bus 416 and one or more input devices 418 such as, for example, a keyboard, mouse, etc. As shown, the system 400 may be connected to a database 420 via a link 422.

FIG. 5 illustrates a database or relation called Part Number Table which includes columns representing a part number (part-no), a product name (product-name), and an expiration date (expire-date). The data in the database should meet certain constraints and should maintain referential integrity, as mentioned above. When a row of data fails to meet such requirements, the data in the row of data should be deleted and the keys related to the row of data are deleted from an index related to the database.

The present application is directed to providing a method of reorganizing a database which provides for both checking that the data in each row of the database complies with predetermined constraints and requirements for referential integrity while also providing for reorganization of the database and the index related to the database to eliminate any holes that may be left by deletion of data during the checking operation.

The method provides for reading out each row of data in a database and analyzing the data according to predetermined rules. The row of data is either retained or deleted according to the predetermined rules. A retained row of data is reloaded into the database. An index related to the database is rebuilt to include keys corresponding to the retained row of data. The method is repeated for each row of data in the database.

Figure 6:
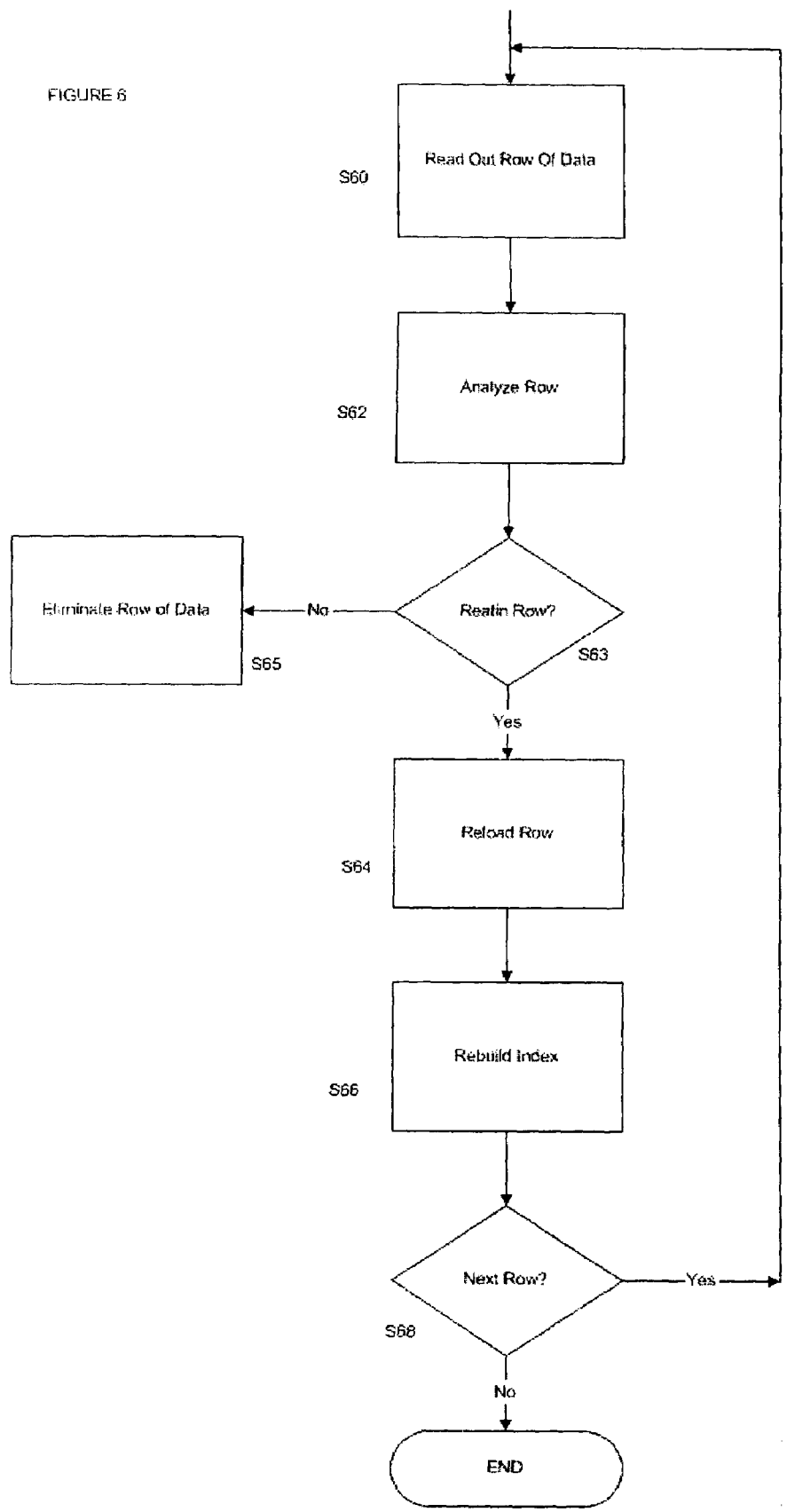
FIG. 6 is a flow chart illustrating a method for reorganizing a database according to an embodiment of the present disclosure.

A method for reorganizing a database according to an embodiment of the present disclosure is explained with reference to FIG. 6. In step S60, a row of data is read out of the database. The row of data is analyzed according to predetermined rules at step 62. The row of data is eliminated or retained in accordance with predetermined rules. The predetermined rules may include check constraints, or constraints and requirements for referential integrity. These rules may be predetermined by a database administrator. These rules may be modified by the database administrator when appropriate. If a row of data is not to be retained (No, step S63), the row of data is eliminated (step S65). If the row of data is to be retained (Yes, step S63), the row of data is reloaded into the database. In step S66, an index related to the database is rebuilt with index keys, or keys, corresponding to the retained row of data if the row of data has been reloaded into the database in step S64. At step S68 a determination is made as to whether another row, or a next row, is present in the index. If there is no next row (No, step S68), the method ends. If there is a next row (Yes, step S68), the process returns to step S60 where the next row is read out of the database. The method is repeated for each row in the database.

As noted above, when data in a row fails to satisfy a constraint or fails to meet requirements for referential integrity, the data is eliminated from the database. The data may be eliminated in a deleting step or may simply not be reloaded into the database. When data in a row satisfies the constraints and the requirements for referential integrity, the data can be retained and reloaded into the database into the next empty row of the database. An empty row is a row in which no data is currently stored. Alternatively, the retained row of data can be loaded into a new database in the next open row of the new database. Thus no empty spaces are left in the database. The resulting reloaded database or the new database include only rows of data which comply with the constraints and the requirements for referential integrity. In addition, the index related to the database can be rebuilt on the fly and includes keys that relate to rows that exist in the reloaded database.

Using the method of the present disclosure, each row of data can be read out and rewritten only once, so that the probability of an error occurring during the input and output stages of the method can be reduced. In addition, only one utility need be run in order to both check and reorganize the data of the rows of the table, to reduce the time used for reorganizing tablespaces in a database. Thus, the down time during which the table is unavailable to user applications and online commerce can be reduced.

According to another embodiment of the present disclosure, a method of reorganizing a database in which the database is divided into a plurality of partitions is provided.

The method includes a step of separating the database and a related index into a plurality of partitions. One of the plurality of partitions of the database is selected along with a related partition of the related index and a row of data of the one selected partition is read out of the partition. The row of data analyzed according to predetermined rules, is either retained or eliminated according to the predetermined rules. A retained row of data is reloaded into the selected one partition. The related partition of the related index is rebuilt to include keys corresponding to the retained row of data reloaded into the selected one partition of the database. Each row of data in the partition is read out and each partition is analyzed. Only one partition of the plurality of partitions is analyzed a time.

As mentioned above, while the reorganization method is functioning, the data in the database is unavailable to applications and for e-commerce. While reducing the time required to perform the reorganizing and checking functions reduces the amount of time the data is unavailable the data is still completely unavailable for some period of time. Partitioning the database into a plurality of partitions and reorganizing each partition independently allows the other partitions of the database to remain available to user applications and for e-commerce. In this manner, at least some of the data ion the database will always be available.

Figure 7:
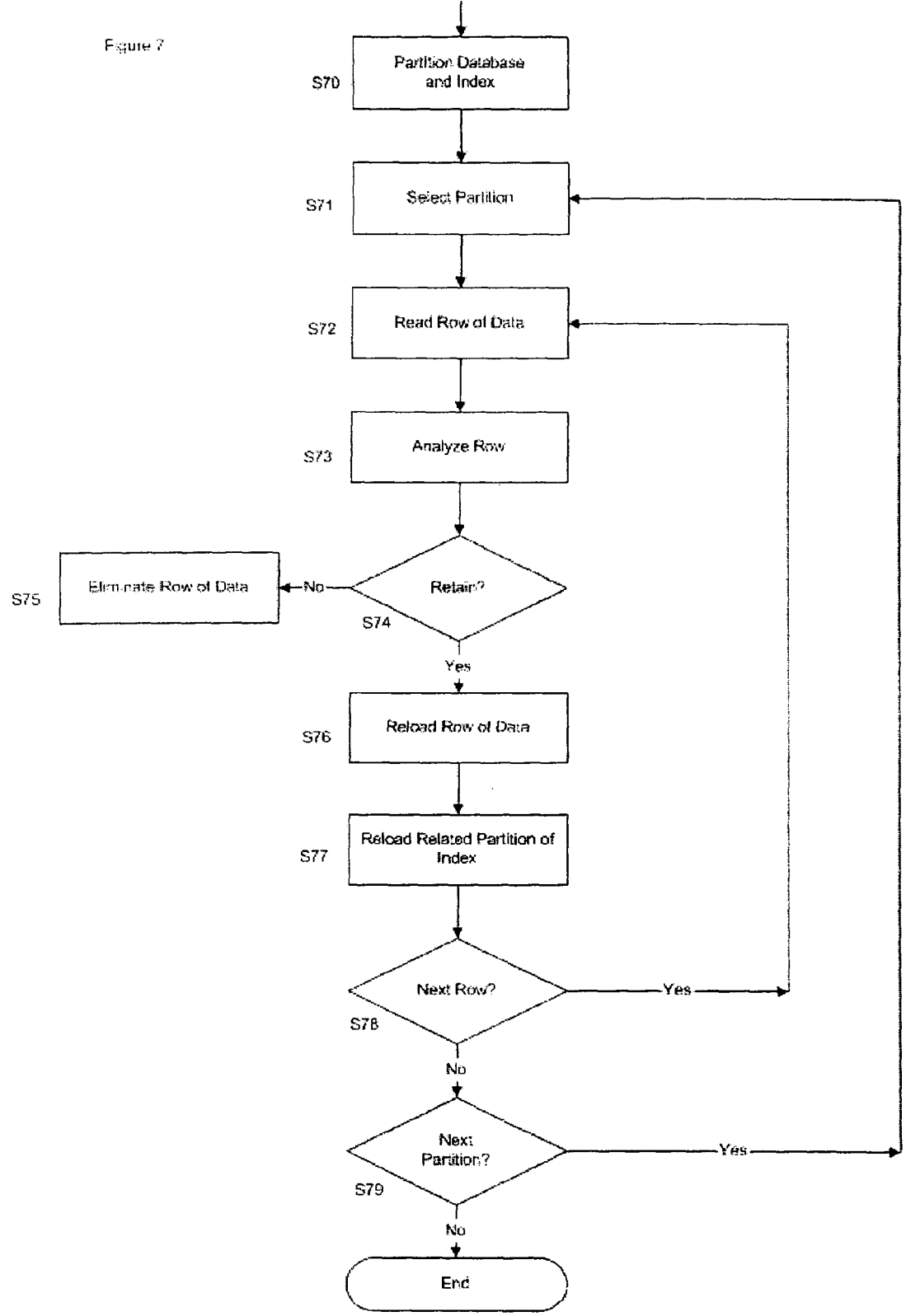
FIG. 7 is a flow chart illustrating a method of organizing a database according to another embodiment of the present disclosure.

The method is further described with reference to FIG. 7. At step S70 a database and a related index are divided into partitions, respectively. The partitions of the related index correspond to those of the database. The number of partitions may depend on the relative size of the database and may be adjusted by a user or the database administrator. This flexibility allows the method to be adapted for use in many different kinds of databases. In step S71 one partition of the plurality of plurality of the database is selected for reorganization along with a related partition of the related index. This selected one partition of the database may be any of the plurality of partitions. A user or the database administrator may designate which of the partitions to be reorganized first based on factors such as frequency of use or perhaps based on the nature of the data contained in the partition. It should be noted that the user or database administrator also sets the constraints and requirements for referential integrity and is therefore likely to be in the best position to determine the best order in which to organize the partitions. Steps S72 to step S78 operate substantially as steps S62 to S68 described above with reference to FIG. 6 except that rows of data are read from and reloaded into a selected partition of the database and a related partition of the index is rebuilt. If the next row is not present (No, step 78), the method may proceed to step 79 where a determination may be made as to whether another partition, or a next partition of the database is present. If no next partition is present (No, step 79), the method ends. If the next partition is present (Yes, step 79) the method may return to step 71 nowhere the next partition is selected. If at step 78, the next row is present (Yes, step 78) the method may return to step 72 and the next row of data is read out of the selected one partition of the database.

As noted above, when data in a row fails to satisfy a constraint or fails to meet requirements for referential integrity, the data is eliminated from the database. The data may be eliminated in a deleting step or may simply not be reloaded into the database. When data in a row satisfies the constraints and the requirements for referential integrity, the data can be retained and reloaded into the selected partition of the database into the next empty row. Alternatively the retained row of data can be loaded into a partition of a new database in the next open row of the new database. Thus no empty spaces are left in either the selected partition of the database or the partition of the new database. The resulting reloaded partition of the database or the partition of the new database include only rows of data which comply with the constraints and the requirements for referential integrity. In addition, the related partition of the index related to the database or the new database can be rebuilt on the fly and includes keys that relate to rows that exist in the reloaded partition of the database or the partition of the new database.

While the above-described method and system are applicable to databases in general, a specific example of such a database is a database constructed in a DB2 environment.

The present disclosure may be conveniently implemented using one or more conventional general purpose digital computers and/or servers programmed according to the teachings of the present specification. Appropriate software coding can readily be prepared by skilled programmers based on the teachings of the present disclosure. The present disclosure may also be implemented by the preparation of application specific integrated circuits or by interconnecting an appropriate network of conventional components.

Numerous additional modifications and variations of the present disclosure are possible in view of the above-teachings. It is therefore to be understood that within the scope of the appended claims, the present invention may be practiced other than as specifically described herein.

What is claimed is:

1. A method of reorganizing a tablespace in a database comprising:
    reading a row of data from a database having a plurality of rows;
    (a) analyzing the row of data read out from the database;
    (b) determining whether to eliminate or retain the row of data based on at least one predetermined rule;
    (c) reloading the row of data into the database when it is determined that the row of data complies with the at least one predetermined rule;
    (d) eliminating the row of data when it is determined that the row of data does not comply with the at least one predetermined rule; and
    (e) rebuilding an index related to the database to include keys that correspond to the reloaded row of data;
    performing steps (b) through (e) for each of the plurality of rows; and
    wherein each of steps (b) through (e) are completed with respect to any particular row of the plurality of rows before any of steps (b) through (e) are performed with respect to a next row of the plurality of rows.

2. The method of claim 1, wherein the at least one predetermined rule comprises a constraint.

3. The method of claim 2, wherein the constraint is a rule that restricts values in the database.

4. The method of claim 1, wherein the at least one predetermined rule is a requirement for referential integrity.

5. The method of claim 4, wherein the requirement for referential integrity is a rule requiring all non-null foreign keys in the database to correspond to an actual key in another database.

6. The method of claim 1, wherein the reloading step comprises:
    reloading the row of data into the database in a first open row of the database, wherein the first open row is a first row in the database that contains no data.

7. The method of claim 1, wherein the reloading step comprises:
    loading the row of data into a second database in a first open row of the second database, wherein
    the first open row is a first row in the second database that contains no data.

8. The method of claim 1, wherein the row of data is eliminated by deleting the row of data.

9. A system for reorganizing a tablespace in a database comprising:
    a reading device adapted to read out a row of data from a database having a plurality of rows;
    (a) an analyzing device adapted to analyze the row of data;
    (b) a determining device adapted to determine whether to eliminate or retain the row of data based on at least one predetermined rule;
    (c) a reloading device adapted to reload the row of data when it is determined that the row of data satisfies the at least one predetermined rule;
    (d) an eliminating device adapted to eliminate the row of data when it is determined that the row of data does not comply with the at least one predetermined rule; and
    (e) a rebuilding device adapted to rebuild an index related to the database to include keys that correspond to the reloaded row of data;
    a performing device adapted to perform steps (b) through (e) for each of the plurality of rows; and
    wherein each of steps (b) through (e) are completed with respect to any particular row of the plurality of rows before any of steps (b) through (e) are performed with respect to a next row of the plurality of rows.

10. The system of claim 9, wherein the at least one predetermined rule comprises a constraint.

11. The system of claim 10, wherein the constraint is a rule that restricts values in the database.

12. The system of claim 9, wherein the at least one predetermined rule is a requirement for referential integrity.

13. The system of claim 12, wherein the requirement for referential integrity is a rule requiring all non-null foreign keys in the database to correspond to an actual key in another database.

14. The system of claim 9, wherein the reloading device reloads the row of data into the database in a first open row of the database, wherein the first open row is a first row in the database that contains no data.

15. The system of claim 9, wherein the reloading device loads the row of data into a second database in a first open row of the second database, wherein the first open row is a first row in the second database that contains no data.

16. The system of claim 9, wherein the eliminating device eliminates the row of data by deleting the row of data.

17. A computer recording storage medium including computer executable code for reorganizing a tablespace in a database, said computer executable code including:

reading code for reading out a row of the data from a database having a plurality of rows;
- (a) analyzing code for analyzing the row of data read out from the database;
- (b) determining code for determining whether to eliminate or retain a row of data based on at least one predetermined rule;
- (c) reloading code for reloading the row of data when it is determined that the row of data complies with the at least one predetermined rule;
- (d) eliminating code for eliminating the row of data when it is determined that the row of data does not comply with the at least one predetermined rule; and
- (e) rebuilding code for rebuilding an index related to the database to include keys corresponding to the reloaded row of data;
  - performing steps (b) through (e) for each of the plurality of rows; and wherein each of steps (b) through (e) are completed with respect to any particular row of the plurality of rows before any of steps (b) through (e) are performed with respect to a next row of the plurality of rows.

18. The computer recording medium of claim 17, wherein the at least one predetermined rule comprises a constraint.

19. The computer recording medium of claim 18, wherein the constraint is a rule that restricts values in the database.

20. The computer recording medium of claim 17, wherein the at least one predetermined rule is a requirement for referential integrity.

21. The computer recording medium of claim 20, wherein the requirement for referential integrity is a rule requiring all non-null foreign keys in the database to correspond to an actual key in another database.

22. The computer recording medium of claim 17, wherein the reloading code reloads the row of data into the database in a first open row of the database, wherein the first open row is a first row in the database that contains no data.

23. The computer recording medium of claim 17, wherein the reloading code loads the row of data into a second database in a first open row of the second database wherein the first open row is a first row in the second database that contains no data.

24. The computer recording medium of claim 17, wherein the eliminating code comprises deleting code for deleting the row of data.

* * * * *